UNITED STATES PATENT OFFICE.

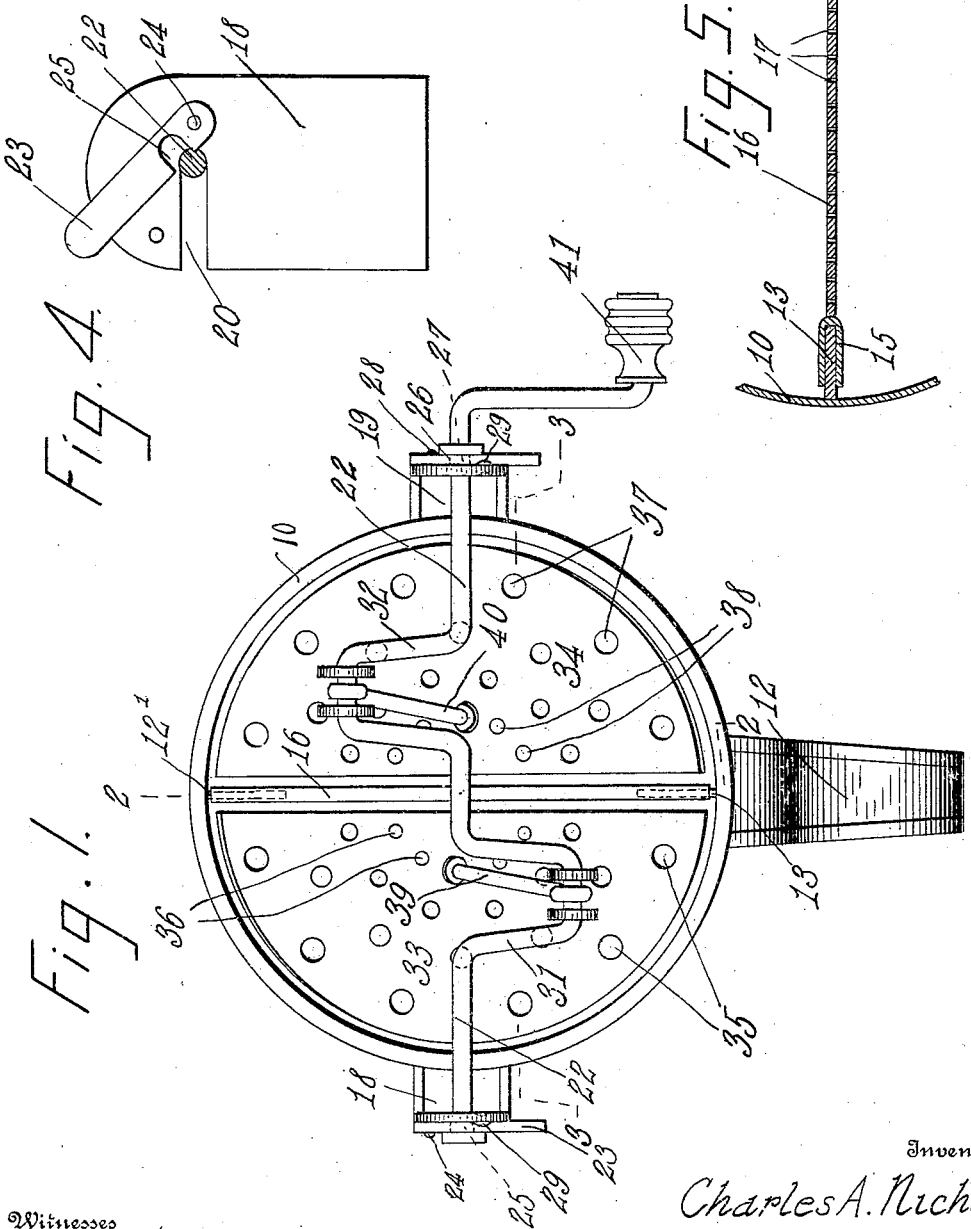

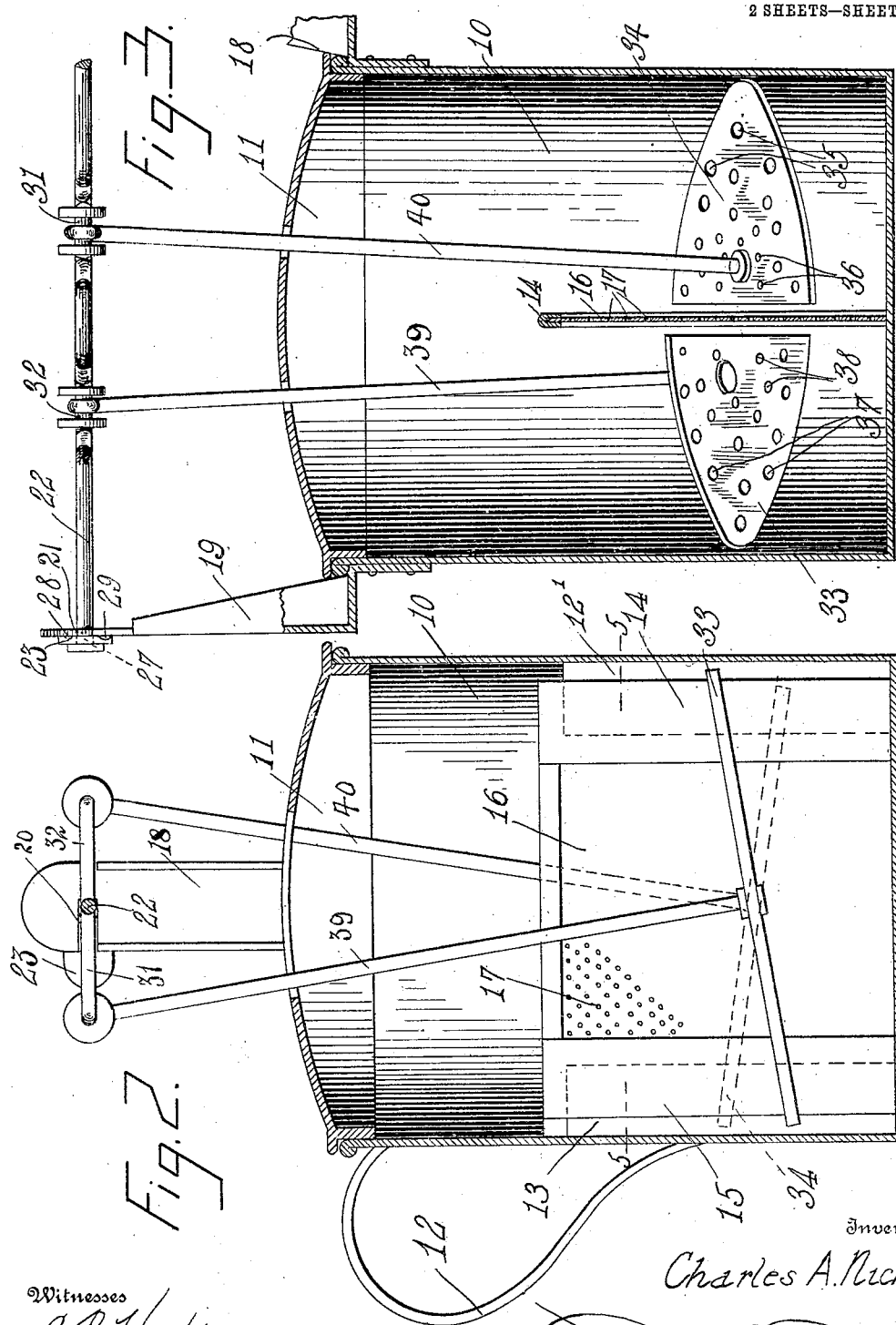

CHARLES A. NICHOLS, OF AMARILLO, TEXAS.

EGG-BEATER.

946,521.   Specification of Letters Patent.   Patented Jan. 11, 1910.

Application filed April 27, 1909. Serial No. 492,448.

*To all whom it may concern:*

Be it known that I, CHARLES A. NICHOLS, a citizen of the United States, residing at Amarillo, in the county of Potter, State of Texas, have invented certain new and useful Improvements in Egg-Beaters; and I do hereby declare the following to be a full, clear, and exact description of the invention, such as will enable others skilled in the art to which it appertains to make and use the same.

This invention relates to egg beaters, and has for one of its objects to simplify and improve the construction and increase the efficiency and utility of devices of this character.

The improved device comprises in general a receptacle having an intermediate partition dividing the receptacle into two compartments, the partition having transverse apertures through its central portions; a perforated follower within each of the compartments formed by the partition; a shaft having oppositely arranged cranks mounted for rotation above the receptacle; and a rod rigidly connected at one end to each of the followers and movably connected at the other ends to the cranks, so that when the shaft is rotated the followers will be caused to reciprocate within the receptacle alternately and likewise caused to tilt from the horizontal at each stroke. By this means the eggs are thoroughly disintegrated and beaten and thrown from side to side of the receptacle by the tilting movement of the follower.

The receptacle and other parts may be constructed of any required size, and of any suitable material, and it is not desired therefore to limit the invention to any specific size or to any specific form of material. The material employed will preferably be of metal, and the receptacle will preferably be cylindrical in form and the followers semi-circular in outline, and for the purpose of illustration a structure of this form is shown, and in the drawings illustrative of the preferred embodiment of the invention—

Figure 1 is a plan view of the improved device with the closure removed. Fig. 2 is a vertical section on the line 2—2 of Fig. 1. Fig. 3 is a vertical section on the line 3—3 of Fig. 1. Fig. 4 is a detail view enlarged illustrating the construction of one of the shaft supporting standards. Fig. 5 is a section of the partition member and a portion of the receptacle, on the line 5—5 of Fig. 2.

The improved device comprises a receptacle 10, preferably cylindrical and formed of sheet metal and provided with a detachable closure 11, and in the smaller forms of the apparatus the casing is provided with a handle 12, to enable the device to be held in one hand while being operated with the other. Secured within the casing 10 at opposite sides thereof are guide ribs 12'—13, and slidably engaging these guide ribs by suitable guide channels 14—15 is a partition 16. The partition is provided in its central portion with a plurality of transverse relatively fine apertures 17. The member 16 is thus readily detachable from the receptacle for cleansing or to permit the receptacle to be employed as a measuring cup, as hereafter explained. Rising from the receptacle 10 at its opposite sides are two standards 18—19, the standards being provided with open lateral slots 20—21 to form bearings for a shaft 22. The standard 18 is provided with a suitable arm 23 pivoted at 24 to the standard and provided with a recess 25 bearing over the shaft 22 when the latter is disposed in position within the slot 20, the shaft being thus locked in position upon the standard. The standard 19 is provided with a similar arm 26 having a notch 27 and pivoted at 28 to the standard 21, and serving the same purpose as the arm 23 above described. By this means the shaft is maintained in position rotatably upon the standards, and can be readily detached therefrom by simply elevating the arms 23—26. The standard 18 is provided with a protuberance 29 beneath which the arm 23 is sprung when in operative position to prevent its accidental displacement, while the standard 19 is provided with similar protuberances serving the same purpose for the arm 26. The shaft 22 is provided with oppositely arranged cranks 31—32 and with an operating handle 41, as shown. Arranged within the receptacle 10 at each side of the partition 16 are follower plates 33—34, the follower plates being semicircular in outline when the receptacle is in circular or cylindrical form. The follower plate 33 is provided with a plurality of relatively large apertures 35 in its outer portion, and a plurality of relatively small apertures 36 in its inner portion, while the follower plate 34 is provided with similar large and small apertures 37—38, as shown. Rigidly connected to the follower plate 33 is a rod 39, while a similar rod 40 is rigidly connected at one end to the follower plate 34. The upper ends of the rods 39—40 are movably coupled to the cranks 31—32.

By this arrangement it will be obvious that when the shaft 22 is rotated the follower plates will be moved vertically and alternately within the receptacle and at opposite sides of the partition, and at the same time tilt from the horizontal by reason of the rigid connection between the rods 31—32 and the followers. By this means as the followers are moved upwardly they cause the egg substance to be thrown toward one side of the casing and then at the return stroke of the follower the egg substance is moved toward the opposite side of the receptacle. Thus the egg substance is not only thoroughly beaten and disintegrated by the movement of the follower but is thrown from side to side during the vertical action. Thus a compound action is produced upon the egg substance which materially increases the efficiency and utility of the device without increasing the expense or the power necessary to operate the same.

The outer portions of the partition 16 being imperforate, the egg substance of each compartment is confined therein, and an efficacious beating action produced between the follower and the imperforate portions of the partition, while at the same time the centrally arranged apertures 17 permit the egg substance to be thrown back and forth from one compartment to the other during the rapid beating action.

The improved device is simple in construction, can be inexpensively manufactured, and of any required size or capacity, and operates effectually for the purpose described.

While the improved device has been described as an egg beater, it is understood that the improved device may be employed for other purposes with equal efficiency; for instance, the improved device may be employed for "whipping" cream, and for similar purposes, and it is understood that it is not desired to limit the device in its operation to any particular material or substance.

By forming the followers with the relatively large apertures near the outer portion and the relatively fine apertures at the inner portion the egg substance is caused to pass more readily through the outer portions of the follower during the outward and downward strokes than through the inner portions, thus causing the more rapid and efficacious beating and mingling of the particles, as will be observed.

The closure member 11 is provided with spaced slots through which the rods 31—32 operate, and will not generally be required when the device is required as an egg beater, but may be necessary when the device is employed for whipping cream, and for like purposes.

What is claimed, is:—

1. In a device of the class described, a receptacle, a vertical partition in said receptacle and provided with transverse perforations in the central portion thereof, a perforated follower at each side of said partition, a shaft mounted for rotation and provided with oppositely arranged cranks, and rods rigidly connected at one end respectively to said followers and movably coupled at their other ends to said cranks, whereby the followers are caused to be operated alternately and tilted from the horizontal at each stroke.

2. In a device of the class described, a receptacle, a vertical partition in said receptacle and provided with transverse perforations in the central portion thereof, a follower within said receptacle at each side of said partition, each follower having a plurality of relatively small apertures in its inner portion and relatively large apertures in the outer portion, a shaft mounted for rotation and provided with oppositely arranged cranks, and rods rigidly connected at one end to said followers and movably connected at the other ends to said cranks.

3. In a device of the class described, a receptacle, vertical guide ribs within said receptacle, a partition slidably engaging said guide ribs and provided with apertures in the central portion thereof, a follower within said receptacle at each side of said partition, a shaft mounted for rotation and provided with oppositely arranged cranks, and rods rigidly connected at one end respectively to said followers and movably coupled at their other ends to said cranks.

4. A device of the class described, a receptacle, a vertical partition in said receptacle and provided with transverse perforations in the central portion thereof, a perforated follower at each side of said partition, standards rising from said receptacle at each side thereof and each provided with a lateral open slot, a shaft mounted for rotation within said slots and provided with oppositely arranged cranks, a locking arm mounted to swing upon each of said standards, a connecting rod rigidly united at one end to each of said followers and movably coupled at the other ends to said crank.

In testimony whereof, I affix my signature, in presence of two witnesses.

CHARLES A. NICHOLS.

Witnesses:
J. R. TROLINGER,
A. C. BUTLER.